United States Patent [19]

Sato et al.

[11] Patent Number: 5,010,226
[45] Date of Patent: Apr. 23, 1991

[54] AUTOMATIC SEAM WELDING APPARATUS

[75] Inventors: Kazuhiro Sato; Tomomi Kishi; Koji Umeda; Yasushi Uchida; Masahiko Takeuchi, all of Toyota, Japan

[73] Assignee: Toyota Jidosha Kabushiki Kaisha, Toyota, Japan

[21] Appl. No.: 403,400

[22] Filed: Sep. 6, 1989

[30] Foreign Application Priority Data

Sep. 28, 1988 [JP] Japan ................................. 63-240678

[51] Int. Cl.$^5$ ............................................ B23K 11/06
[52] U.S. Cl. .................................... 219/81; 219/86.41; 901/42
[58] Field of Search ............. 219/78.01, 81, 82, 86.25, 219/86.41; 901/42

[56] References Cited

U.S. PATENT DOCUMENTS 3,581,046  5/1971  Letsche ................................ 219/82
4,652,719  3/1987  Fujita et al. ........................... 219/82
4,785,153 11/1988  Stimmel ............................ 219/86.41

FOREIGN PATENT DOCUMENTS

60-34382  3/1985  Japan .
6013274   1/1987  Japan .

Primary Examiner—Clifford C. Shaw
Attorney, Agent, or Firm—Finnegan, Henderson, Farabow, Garrett and Dunner

[57] ABSTRACT

An automatic seam welding apparatus for fuel tanks comprises a jig for holding two workpieces disposed one above the other to form a fuel tank, a pair of roller electrodes vertically arranged for nipping and welding the overlapping peripheral flange portion of the workpieces, and a robot assembly rotatably supporting the jig and controlling the horizontal and vertical positions and the inclination of the jig held workpieces relative to the electrodes for welding peripheral flange portions that are irregular with high quality welds. The jig is easily detachable from the robot to permit many different shaped tanks to be welded by the same apparatus.

12 Claims, 7 Drawing Sheets

AUTOMATIC SEAM WELDING APPARATUS

BACKGROUND OF THE INVENTION

1. Field of the invention

The present invention relates to an automatic seam welding apparatus, and more specifically to an apparatus for seam welding flange portions of vertically divided workpieces to make a fuel tank for a vehicle.

2. Description of the Prior Art

Figure 8:
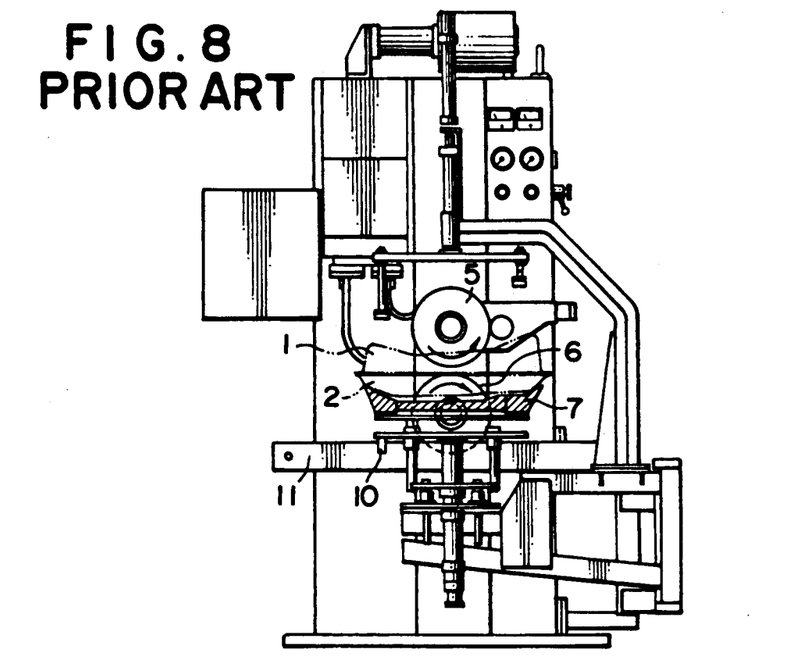
FIG. 8 is an elevational view of a conventional seam welding apparatus.
Figure 9:
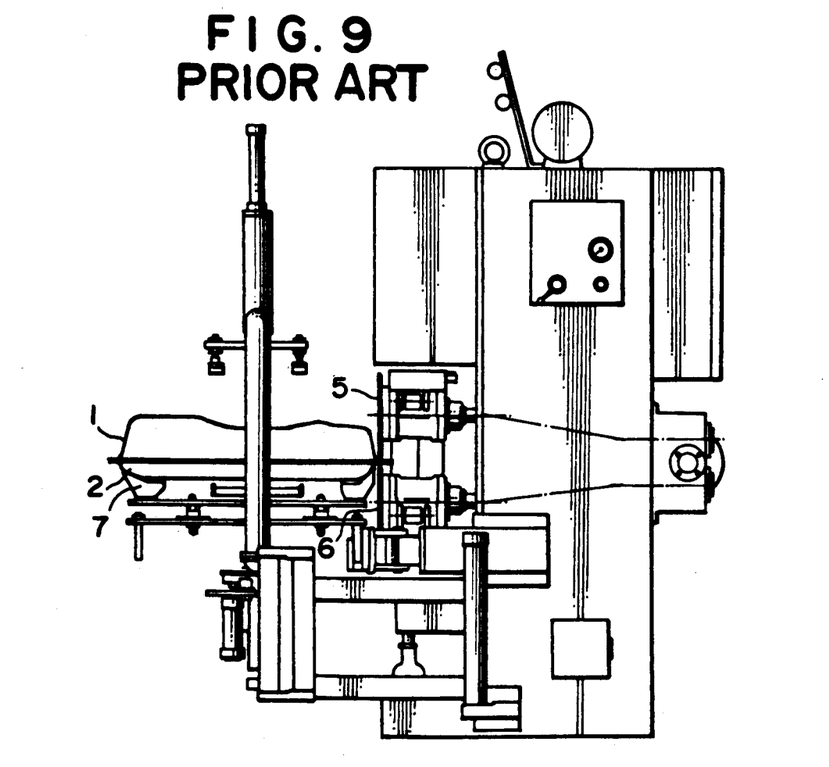
FIG. 9 is a side view of the apparatus shown in FIG. 8.
Figure 10:
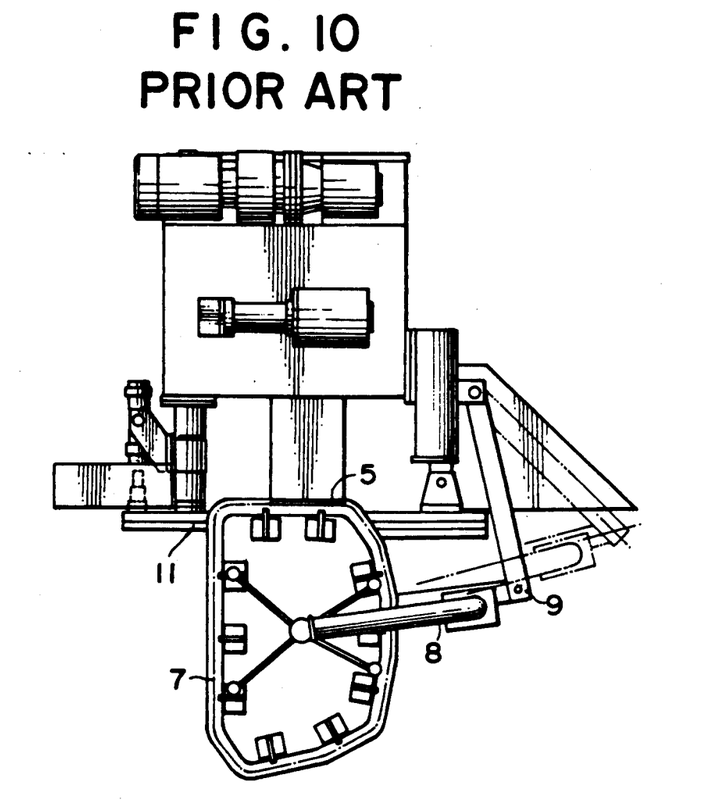
FIG. 10 is a plan view of the apparatus shown in FIG. 8.
Figure 11:
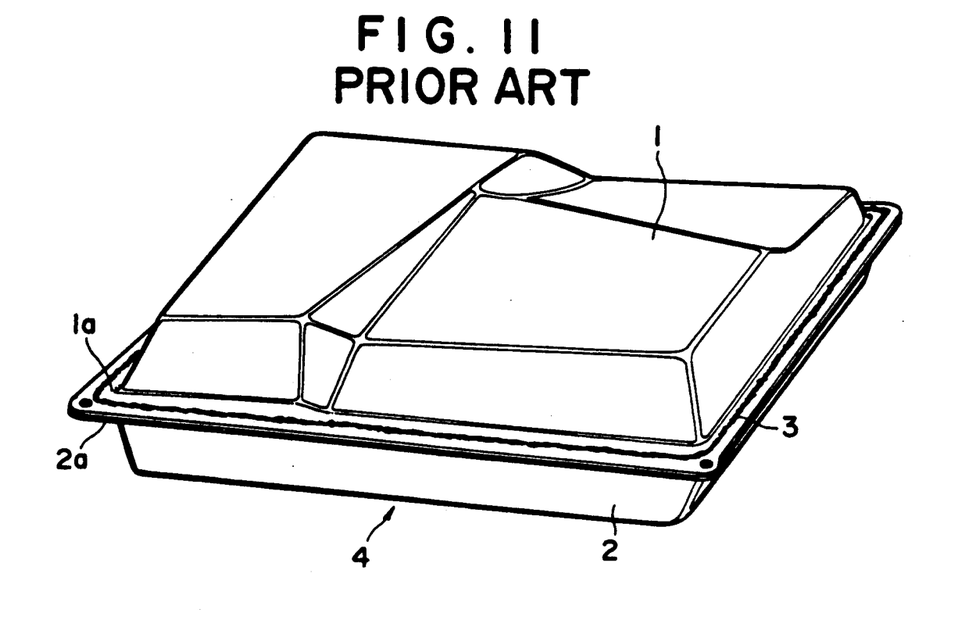
FIG. 11 is an enlarged perspective view of an example of a fuel tank to be welded by the apparatus shown in FIG. 8 and which is restricted in shape.

A fuel tank for a vehicle is generally constructed of two vertically divided workpieces. After assembling parts in the workpiece, the manufacture of the fuel tank is completed by connecting overlapping flange portions of the workpieces by seam welding. The seam welding of the vertically divided two workpieces that constitute a fuel tank is performed by using, for example, a seam welding apparatus as shown in FIGS. 8–10. Two workpieces 1 and 2 constituting a fuel tank 4 are seam welded along a weld line 3 on overlapping flange portions 1a and 2a of the workpieces as shown in FIG. 11. Disc type electrodes 5 and 6 nip the flange portions 1a and 2a of workpieces 1 and 2 at a predetermined nipping force; and the seam welding is performed by continuous resistance welding between the electrodes associated with the rotation of the electrodes.

In this seam welding, workpieces 1 and 2 are held by a work holding jig 7, and the two workpieces are rotated, together with the work holding jig in a horizontal plane by rotating electrodes 5 and 6 which continuously feed the flange portions 1a and 2a of the workpieces. At the same time, arms 8 and 9 move with a circular arc motion following the rotation of electrodes 5 and 6; and a pin 10 provided below work holding jig 7, is guided along a cam groove of a cam plate 11 which is custom made according to the shape of each fuel tank. Thus, weld line 3 on flange portions 1a and 2a of workpieces 1 and 2 is formed as a desirable formed line. Japanese Utility Model publication SHO 60-34382 discloses an automatic profile control mechanism of a seam welding apparatus similar to the above mechanism.

In such a conventional seam welding apparatus, a dedicated work holding jig 7 and dedicated cam plate 11 corresponding to the peripheral shape of each kind of fuel tank are required. In the practical manufacture of fuel tanks, the exchange of the mechanism, including cam plate 11 and pin 10, requires a fairly long time and much manpower. Therefore, in most instances, an entire seam welding apparatus is reserved for each particular shaped fuel tank so as not to require the exchange of the jig and cam plate mechanism. Therefore, different fuel tanks having different shapes cannot be manufactured by the same welding apparatus, or in the same manufacturing process. As a result, a different welding apparatus for each kind of fuel tank must be installed in a seam welding process, thereby increasing the cost and the required space for the apparatus.

Moreover, in the conventional apparatus shown in FIGS. 8–10, flange portions 1a and 2a of workpieces 1 and 2 must horizontally extend in order to seam weld them with a desirable weld line. However, this limitation on the shape of the flange portions greatly restricts the design of a fuel tank.

Furthermore, in the conventional apparatus, the position of the rotation center of lower electrode 6 is usually fixed, and upper electrode 5 is pressed downwardly toward the lower electrode at a predetermined pressure. A high quality weld is required for the seam welding portion of a fuel tank to prevent the leakage of fuel or fuel gas. To satisfy this requirement, the surfaces (peripheries) of electrodes 5 and 6 are usually cut away gradually during welding by cutting tools for the purpose of eliminating the impurities which adhere to the surfaces of the electrodes during welding. Therefore, the diameters of electrodes 5 and 6 gradually decrease as a function of the their repetitive use. Since the rotational center position or axis of lower electrode 6 is fixed as described above, the decrease in its diameter causes the formation of a gap between the electrode and a work to be welded, thereby causing deterioration of the welding quality and/or deformation of the work. To prevent such problems from occurring, an operator jacks up lower electrode 6 and adjusts the vertical position of the electrode at appropriate intervals in the conventional apparatus. However, such an adjustment conducted by the operator becomes a great burden to the fuel tank manufacturing process.

Although JP-A-62-13274 discloses an automatic seam welding apparatus wherein workpieces are held by a robot, the positional relationship between the flanges of the workpieces and electrodes in the width direction of the flanges is controlled; that is, the orbit of the electrodes on the flanges is controlled in the width direction of the flanges. However, such publication neither points out the aforementioned various problems associated with the conventional apparatus, such as one shown in FIGS. 8–10, nor discloses means for solving the problems.

SUMMARY OF THE INVENTION

An object of the present invention is to provide an automatic seam welding apparatus wherein various fuel tanks having different shapes can be easily welded by the same apparatus.

Another object of the present invention is to provide an automatic seam welding apparatus which can seam weld a fuel tank whose flange portion to be welded extends in a direction other than a horizontal direction, thereby removing a restriction in the design of a fuel tank.

A further object of the present invention is to provide an automatic seam welding apparatus which does not require adjustment of the vertical positions of electrodes during welding, thereby increasing the weld quality of a fuel thank as well as decreasing the burden of an operator.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

In order to achieve the objects and in accordance with the purpose of the invention as embodied and broadly described herein, an automatic seam welding apparatus according to the present invention comprises a work holding jig for holding two vertically divided workpieces which form a fuel tank, a pair of rotational electrodes vertically arranged for nipping and seam welding overlapping flange portions of the workpieces, and a robot detachably and rotatably supporting the work holding jig and controlling the horizontal and vertical positions, and the inclination of the workpieces held by the work holding jig relative to the electrodes.

In the seam welding apparatus, the overlapping flange portions of the workpieces are nipped by the electrodes, the workpieces are rotated and moved by the robot in accordance with a predetermined teaching to the robot, and the seam welding proceeds as a function of the rotation of the electrodes. The desired welding portion on the flange portions is positioned between the electrodes by controlling the horizontal and vertical positions, and the inclination of the workpieces by the robot, which is controlled according to its teaching. Since the position and angle of the flange portions is controlled in all three dimensional directions, the portion to be welded can be always and accurately positioned between the electrodes regardless of the direction in which the flange portions extend. Therefore, any fuel tank having any shape can be easily welded as desired. As a result, the restriction on the design of a fuel tank, as in the conventional welding apparatus, can be completely removed. Also various fuel tanks having different shapes can be welded in identical apparatus merely by exchanging the work holding jig, and choosing the preset teaching of the robot.

Moreover, since the vertical position of the workpieces can be controlled by the corresponding vertical position control of the robot to an optimum position relative to the electrodes, the optimal positional relationship between the electrodes and the flange portions of the workpieces can be easily maintained during the entire weld and after repeated welding, even though the diameter of the lower electrode decreases during seam welding because of cutting by a cutting tool. As a result, the adjustment of the vertical position of the lower electrode is for the most part unnecessary to obtain a high quality weld, and the burden of an operator is decreased.

BRIEF DESCRIPTION OF THE DRAWINGS

The accompanying drawings which are incorporated in and constitute a part of this specification, illustrate one embodiment of the invention and together with the description, serve to explain the principles of the present invention.

DETAILED DESCRIPTION OF A PREFERRED EMBODIMENT OF THE PRESENT INVENTION

Figure 1:
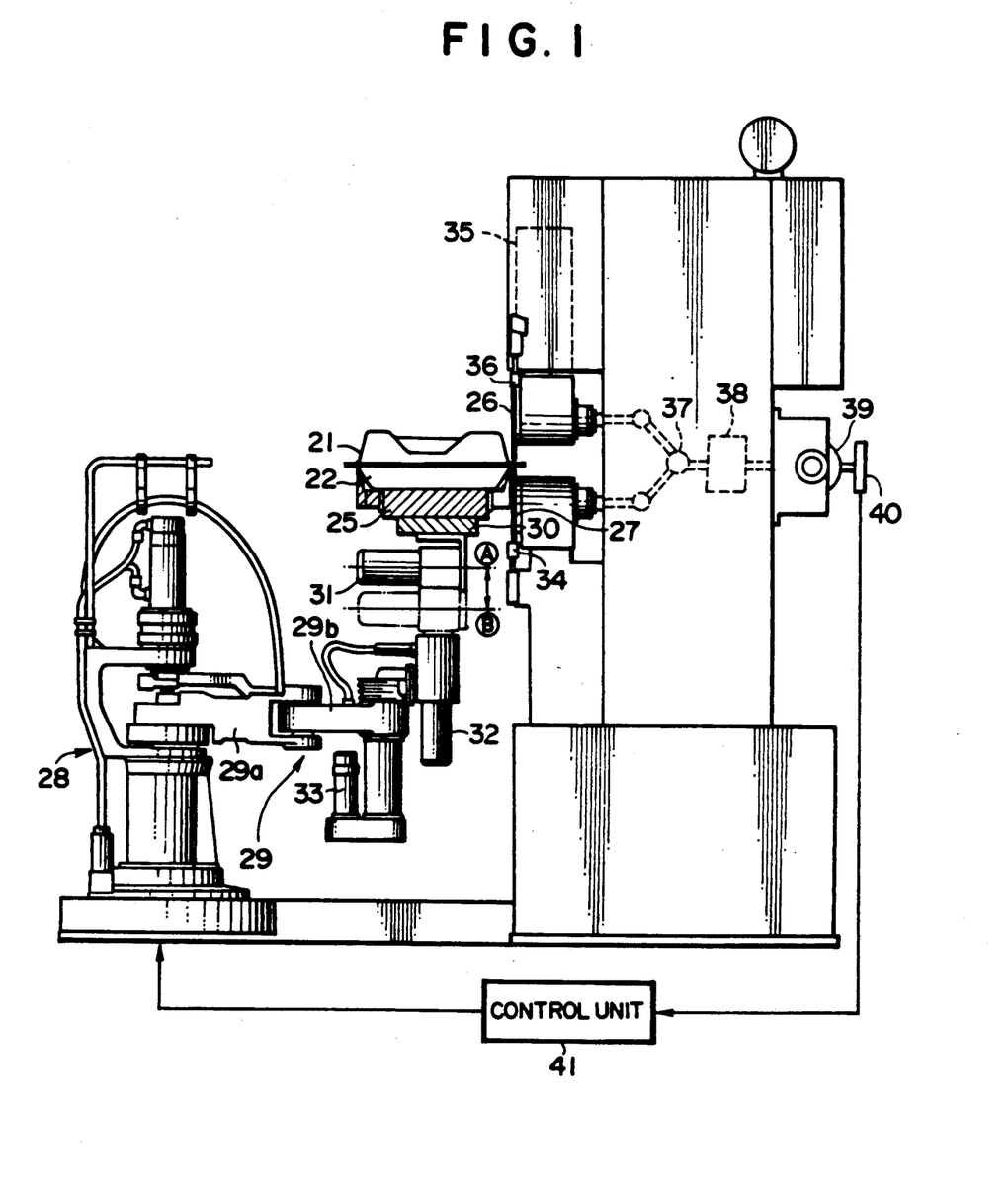
FIG. 1 is a side view of an automatic seam welding apparatus according to an embodiment of the present invention.
Figure 2:
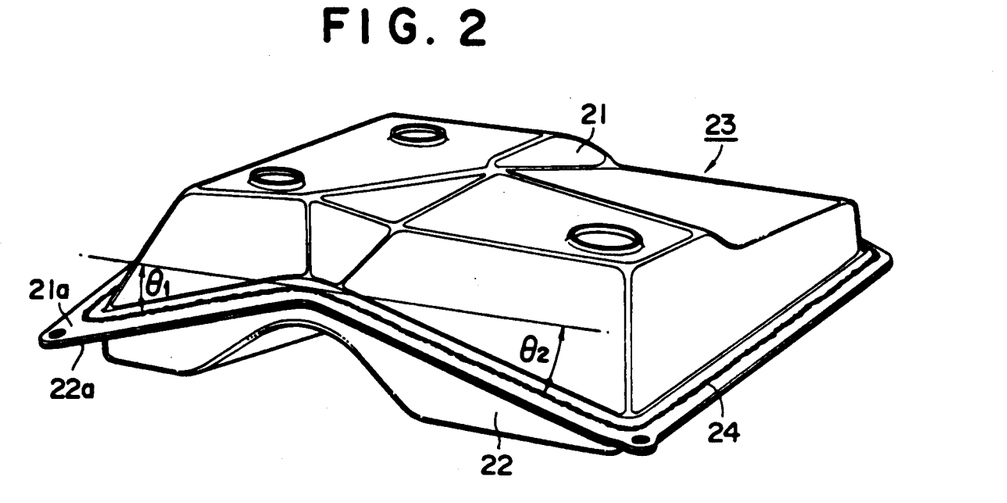
FIG. 2 is an enlarged perspective view of an example of a fuel tank to be welded by the apparatus shown in FIG. 1.

Referring to the drawings, FIGS. 1 and 3-7 illustrate an automatic seam welding apparatus according to an embodiment of the present invention, and FIG. 2 illustrates an example of a fuel tank for a vehicle which can be seam welded by the apparatus. In FIG. 2, two workpieces 21 and 22 are divided vertically to form a fuel tank 23. Flange portions 21a and 22a of workpieces 21 and 22 extending along the peripheries of the workpieces overlap to each other, and the flange portions are seam welded along a weld line 24 to form fuel tank 23. In this embodiment, flange portions 21a and 22a have portions inclining at angles $\theta_1$ and $\theta_2$ relative to a horizontal plane.

Workpieces 21 and 22 are set together at a predetermined positional relationship, and are held by a work holding jig 25. The overlapping flange portions 21a and 22a of workpieces 21 and 22 on work holding jig 25 are seam welded between an upper electrode 26 and a lower electrode 27 which are disc type rotational electrodes. Work holding jig 25 is made as a dedicated jig in accordance with the shape of each fuel tank. The work holding jig 25 is supported by an attachment 30 which is attached to the tip portion of a robot arm 29 of a robot 28.

Motors 31, 32 and 33 are mounted on robot arm 29. Motor 31 controls the inclination angle of workpieces 21 and 22 held by the tip portion of robot arm 29 via attachment 30 and work holding jig 25. Motor 32 controls the rotation of jig 25 and workpieces 21 and 22 in a horizontal plane or the like. Motor 33 controls the vertical position of workpieces 21 and 22. Robot arm 29 has an arm 29a and an arm 29b connected to each other, and the horizontal position of workpieces 21 and 22 are controlled via control of the rotational angles and the folding angle of the arms 29a and 29b.

The rotational center or axis of lower electrode 27 is fixed, and the periphery of the electrode is gradually cut away during welding by a cutting tool 34 which confronts the periphery. The diameter of electrode 27 can be measured by detecting the tip position of cutting tool 34. The vertical position of upper electrode 26 is controlled by a vertical drive means 35, and flange portions 21a and 22a of workpieces 21 and 22 are nipped and pressed between electrodes 26 and 27 by moving the upper electrode downwardly. A cutting tool 36 engages the periphery of upper electrode 26, and the cutting tool moves vertically together with the upper electrode.

Upper and lower electrodes 26 and 27 are connected to a motor 39 (a servo-motor) via a universal joint 37 and a reducer 38, and the rotation of the electrodes is controlled by the control of the motor. A tachogenerator 40 is attached to motor 39, and the rotational speeds of electrodes 26 and 27 can be detected by the tachogenerator. Tachogenerator 40 is connected to a control unit 41. Control unit 41 sends to robot 28 the command signal for the motion of robot arm 29 and the control signals for the rotations of motors 31, 32 and 33 according to a preconducted and memorized teaching to the robot in accordance with the shape of workpieces 21 and 22, and the rotational speed signals of electrodes 26 and 27 from tachogenerator 40.

Figure 4:
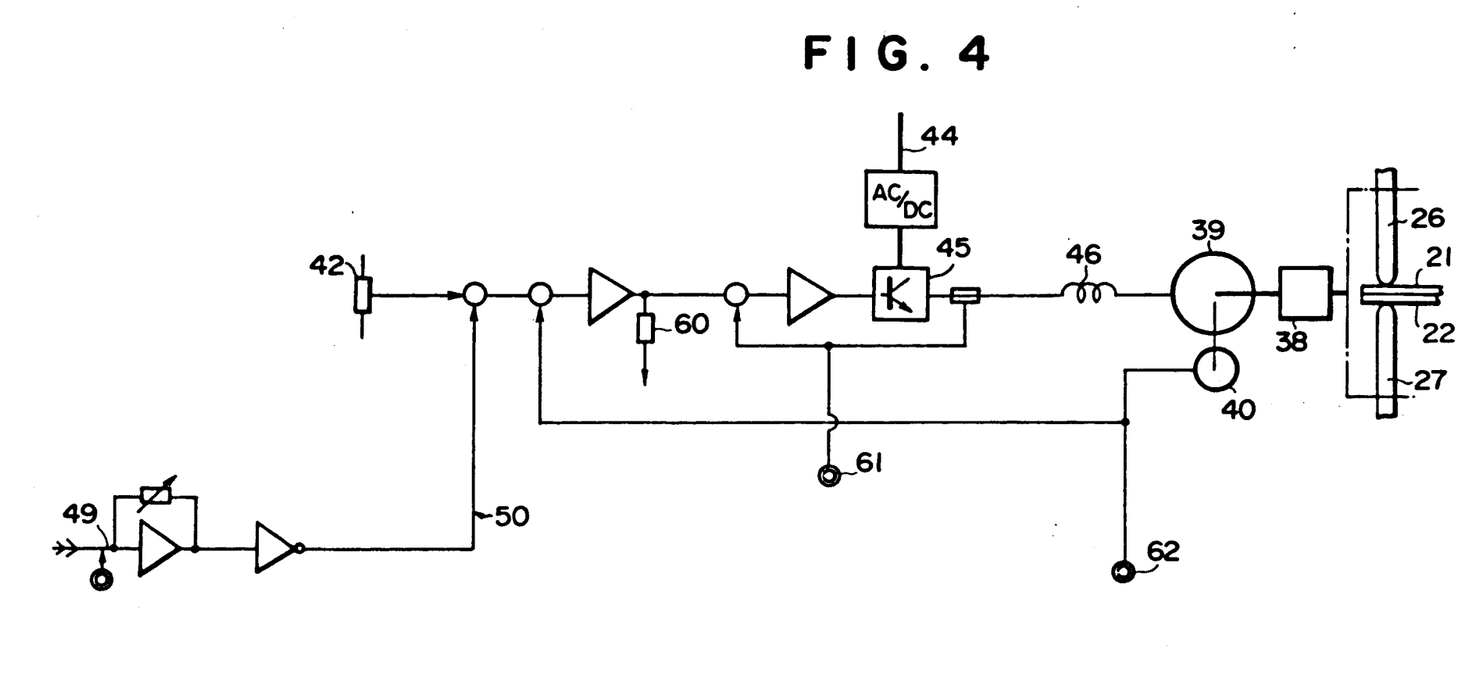
FIG. 4 is a circuit diagram showing an example of controlling the rotational speeds of electrodes shown in FIG. 1.
Figure 5:
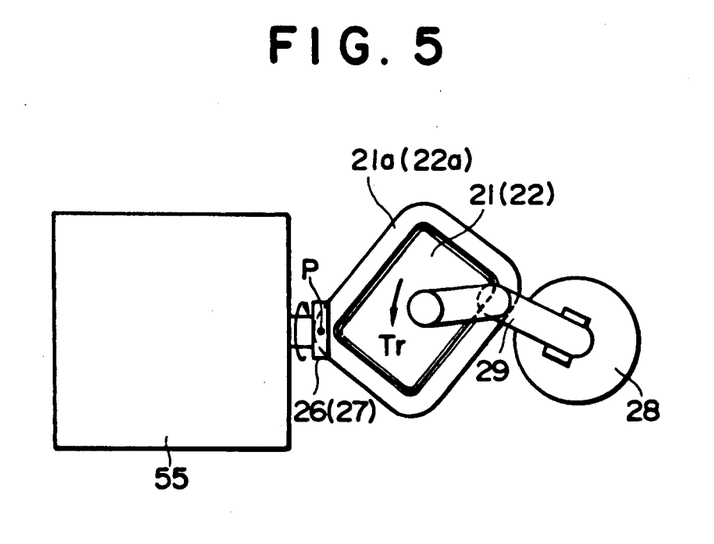
FIG. 5 is a schematic plan view of the apparatus shown in FIG. 1.
Figure 6:
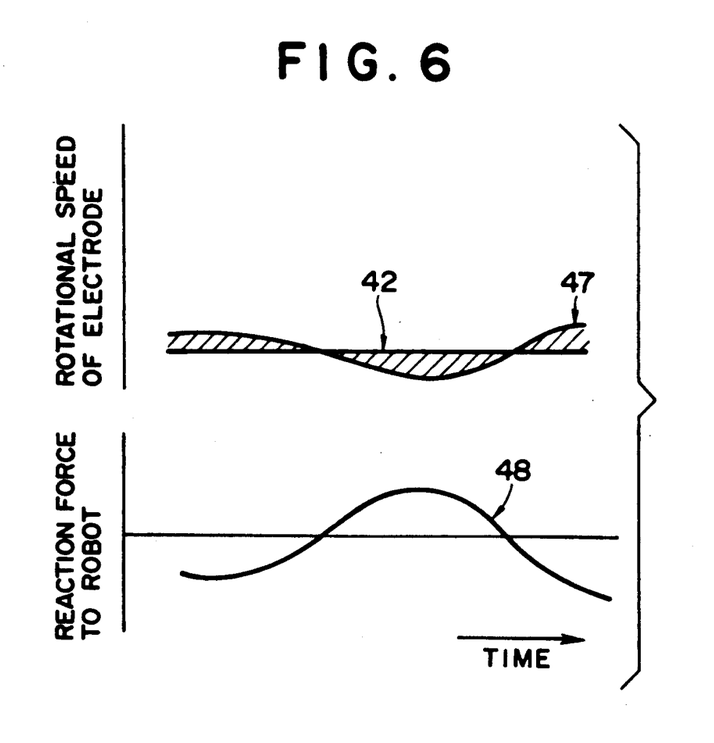
FIG. 6 is a diagram showing characteristics of rotational speeds of electrodes and a reaction force to a robot in using the circuit shown in FIG. 4.

The rotational speeds of electrodes 26 and 27 are controlled, for example, by a system shown in FIG. 4. In this system, the rotational speed of motor 39 is controlled to a desired speed according to a signal created by adding a constant rotational speed command signal 42 to a signal 50 corresponding to a feedback signal 49 from the load of robot 28, which is required for the rotation of workpieces 21 and 22. A power source circuit 44 is connected to this control circuit, and a transistor 45 and a reactor 46 for smoothing the signal are provided in this control circuit. The gain can be adjusted by an adjusting resistor 60, and the motor torque (electrode torque) signal and the motor speed (electrode speed) signal are output to monitors 61 and 62, respectively. To stabilize seam weld line 24 in this embodiment, it is desirable to completely tune the rotational speeds of electrodes 26 and 27 and the moving speed of the workpieces 21 and 22 at a welding point P (FIG. 5). In practice, however, this tuning is not easy. Accordingly, in this embodiment, the initiative for rotating workpieces 21 and 22 is given to robot 28, that is, the workpieces are rotated substantially by the rotational torque Tr of the robot, and the rotational speeds of electrodes 26 and 27 are controlled so as to minimize the torque of the robot. In such a system, the actual speeds of electrodes 26 and 27 are determined by the taught speed of robot 28. If the constant command signal 42 shown in FIG. 4 is directly sent to motor 39, there occurs a difference between the command speed and the actual speed 47 of the electrodes; and the generated torque on the electrodes, due to the difference, becomes a reaction force 48 to robot 28, as shown in FIG. 6. To correct the difference, summing signal 50 according to the torque Tr of robot 28, is applied to the constant command signal 42 as shown in FIG. 4, and the resulting signal is sent to motor 39 so as to minimize the difference; that is, minimize the rotational torque Tr of the robot. Although the above robot torque feedback system is preferable, the rotational speeds of electrodes 26 and 27 may be controlled merely in accordance with constant rotational speed command signal 42.

Figure 3:
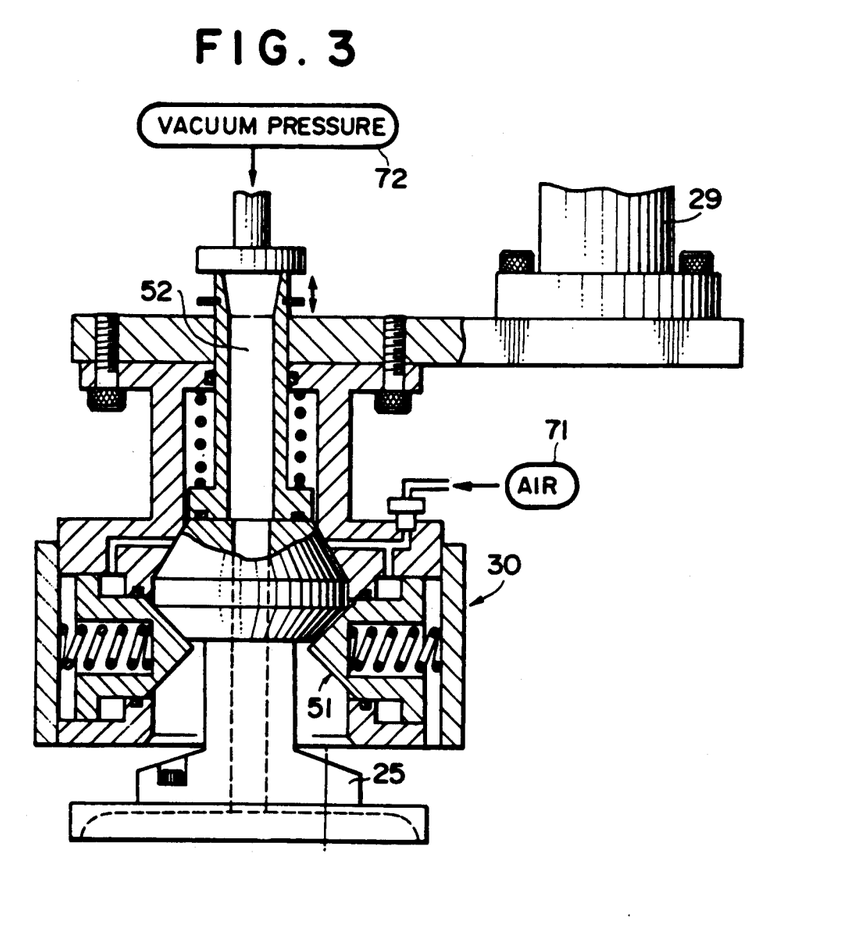
FIG. 3 is an enlarged partial vertical sectional view of the apparatus shown in FIG. 1.

Work holding jig 25 is supported in attachment 30 as shown in FIG. 3. FIG. 3 is illustrated vertically reverse to FIG. 1 with respect to the corresponding portion of FIG. 1. Attachment 30 is attached to the tip portion of robot arm 29, and the attachment has a clamp holder 51 detachably clamping and fixing work holding jig 25. In more detail, clamp holder 51 clamps the enlarged shaft portion of jig 25 inserted into the bore of attachment 30. Work holding jig 25 can be easily detached from clamp holder 51 by supplying unclamp air 71. A vacuum pressure 72 is introduced into work holding jig 25 fixed by clamp holder 51 through a vacuum path 52, and workpiece 22 can be held to the work holding jig by the suction due to the vacuum pressure.

Figure 7:
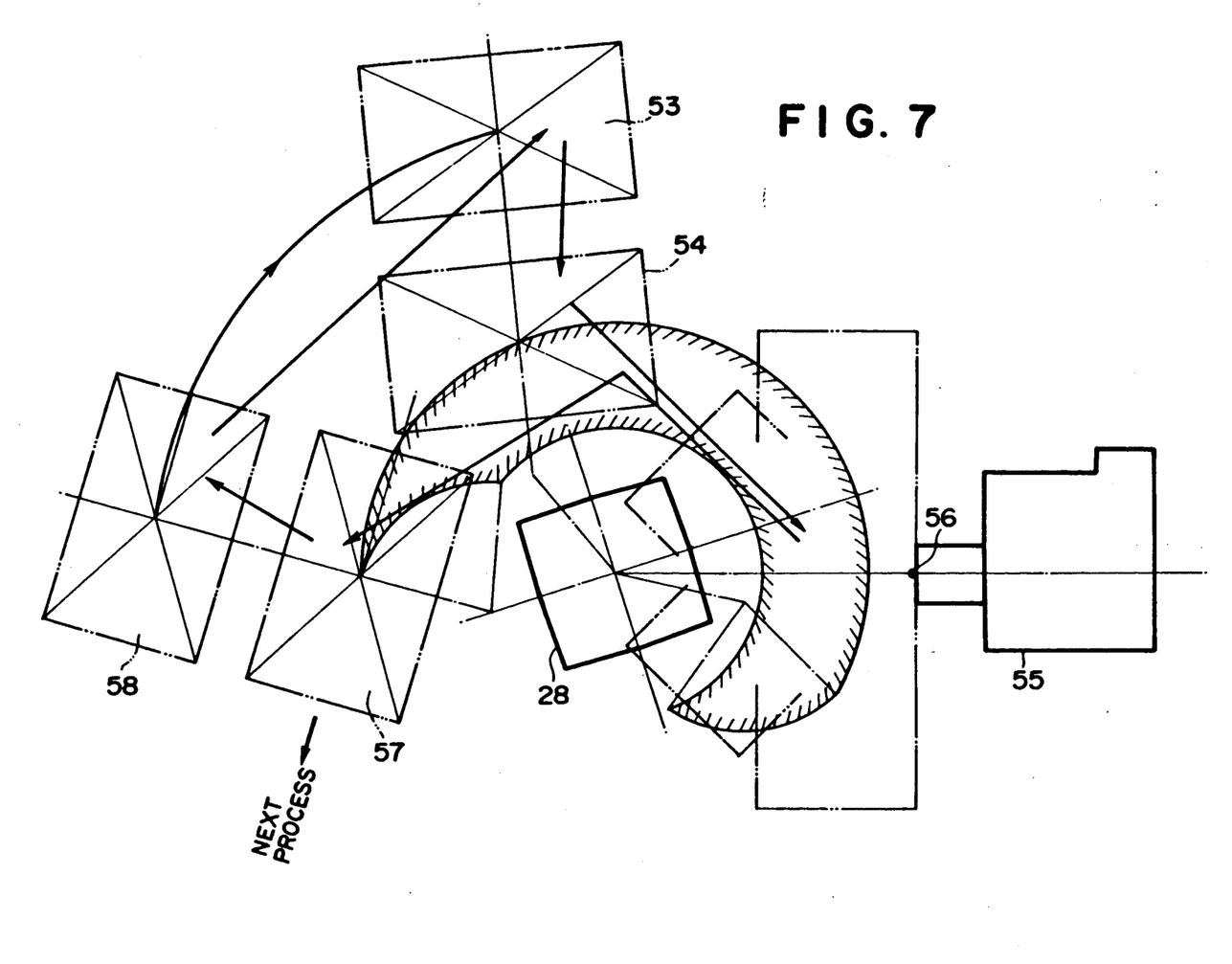
FIG. 7 is a schematic plan view of a process using the apparatus shown in FIG. 1.

The detachment of work holding jig 25 from, and the attachment of another work holding jig to, robot 28; that is, exchange of the work holding jig and the setting of workpieces 21 and 22 are performed, for example, as shown in FIG. 7. Workpieces 21 and 22 are set on work holding jig 25 in a pre-process position 53, the set assembly is slid by a carriage 54 to the robot location, and the work holding jig is held by robot 28. Work holding jig 25 and workpieces 21 and 22 are moved to a predetermined welding position in the seam welding apparatus 55 by robot 28, and the workpieces are seam welded between electrodes 26 and 27 at a seam welding point 56. The completed fuel tank 23 is conveyed to post-process position 57 together with work holding jig 25 by the rotary motion of robot 28. The work holding jig is carried to a waiting position 58 and conveyed to pre-process position 53, and only the completed fuel tank is sent to a next process.

In this embodiment, since workpieces 21 and 22 are held by the tip portion of robot arm 29 via work holding jig 25; and the work holding jig is detachably supported by attachment 30 attached to the tip portion of the robot arm, the work holding jig can be easily exchanged to correspond to the shape of a fuel tank. Especially when the system shown in FIG. 7 is employed, the exchange of the work holding jig can be automatically performed. Accordingly, many kinds of fuel tanks can be manufactured in the same manufacturing line. Moreover, since the alteration of a fuel tank due to the model change of a vehicle can be coped with merely by the reconstruction of work holding jigs, the cost of manufacturing of fuel tanks can be greatly reduced.

The cumulative rotational frequency of motor 39 (or electrodes 26 and 27) is detected by tochogenerator 40, and the vertical and horizontal positions and the inclination of workpieces 21 and 22 are controlled by robot 28 according to the detected cumulative rotational frequency so as to form desired weld line 24. Since the motion of workpieces 21 and 22 can be controlled three dimensionally in all directions, flange portions 21a and 22a can be easily and accurately seam welded regardless of the direction the flange portions extend. Therefore, practically all fuel tanks having various shapes can be seam welded in the welding apparatus of the present invention, and the restriction on the design of a fuel tank required by conventional apparatus can be completely eliminated. Moreover, in the seam welding in this embodiment, since the load of robot 28 for the rotation of workpieces 21 and 22 is fedback, and the rotational speed command signal 42 for the rotation of electrodes 26 and 27 is corrected by the fedback load signal, the rotational speeds of the electrodes can be controlled to a desirable speed so as to accurately form a desired weld line, and minimize the robot torque. As a result, the quality of the completed fuel tank for preventing the leakage of fuel and fuel gas can be extremely increased and the strengths of robot arm 29 and a shaft (not shown) of the robot for rotating the works can be sufficiently ensured.

Although workpieces 21 and 22 are rotated substantially by the rotational driving force of robot 28, the workpieces may be rotated primarily by the rotational driving force of electrodes 26 and 27, nipping the flange portions 21a and 22a of the works. On the other hand, electrodes 26 and 27 may be rotated primarily by workpieces 21 and 22 which in turn are rotated by robot 28, while a constant or stepped auxiliary torques are applied to the electrodes.

Further, since the vertical position of work holding jig 25 can be freely changed, for example, from point "A" to point "B" in FIG. 1, the vertical position of flange portions 21a and 22a of workpieces 21 and 22 can be easily and accurately controlled to a desired position in accordance with the amount of the decrease of the diameter of lower electrode 27 calculated from the cumulative rotational frequency of motor 39 or from the variation of the position of cutting tool 34. Therefore, the relative positional relationship between electrode 27 and flange portions 21a and 22a to be welded can be always maintained to an optimum relationship either during an initial single seam welding and after repeated seam weldings. As a result, a completed fuel tank welded by this apparatus can have a high quality weld, and the capability of the fuel tank for sealing liquid and gaseous fuel is greatly increased.

Furthermore, since the automatic exchange and carrying system for work holding jig 25 and workpieces 21 and 22 is employed in this embodiment as shown in FIG. 7, the time for manufacturing fuel tanks can be greatly shortened and the work load of operators can be further decreased.

Although one preferred embodiment of the present invention has been described herein in detail, it will be appreciated by those skilled in the art that various modifications and alterations can be made to it without materially departing from the novel teachings and advantages of this invention. Accordingly, it is to be understood that the present invention covers all such modifications and variations provide they come within the scope of the appended claims and their equivalents.

What is claimed is:

1. An apparatus for seam welding overlapping peripheral flange portions of two workpieces disposed one on top of the other to form a tank, the apparatus comprising:
    a base;
    a pair of roller electrodes rotatably mounted to the base, the electrodes having opposing peripheral surfaces for nipping and seam welding the overlapping peripheral flange portions of workpieces disposed therebetween;
    means for sensing the diameter of one of the roller electrodes;
    a jig for holding the two disposed workpieces;
    a robot assembly mounted to the base, the robot assembly including an articulate arm, the arm being manipulatable in the horizontal, vertical, and inclined planes, means for moving the outer end of the arm in horizontal, vertical and inclined planes relative to the opposing surfaces of the pair of electrodes for maintaining the flange of the tank in the desired welding orientation in accordance with the sensed diameter of said roller electrode and regardless of the inclination and variation of the flange portion of the tank in the horizontal and vertical planes;
    means for detachably and rotatably mounting the jig to the outer end in the bore of the arm; and
    control means including means for seam welding the peripheral flange portions of workpieces held by the jig during feeding of the flange portions between the opposite electrode surfaces.

2. The apparatus according to claim 1 wherein the control means includes means for generating a constant rotational speed command signal, and further comprises means for controlling the rotational speeds of the electrodes in accordance with the constant rotational speed command signal.

3. The apparatus of claim 1 wherein the control means includes means for rotating the arm to feed the flange portion of a tank, disposed in the jig, between the opposing surfaces of the electrodes.

4. The apparatus of claim 3 wherein the electrodes are rotated in response to the movement of the jig feeding of the flange portion of the tank between the electrode surfaces.

5. The apparatus according to claim 1 wherein the electrodes nip the flange portion between the opposing surfaces and the control means includes means for rotating the electrodes to feed the flange portions between the electrodes.

6. The apparatus according to claim 1 wherein the jig includes a shaft portion, and the outer end of the arm of the robot includes a bore for receiving the shaft portion of the jig, and wherein the means for detachably supporting the jig includes a clamp and resilient means urging the clamp in engagement with the shaft portion for mounting the shaft portion in the bore of the robot arm.

7. The apparatus of claim 6 wherein the shaft has a portion of increased diameter with inclined surfaces, and the clamp includes at least one member having surfaces parallel to the inclined surfaces, the inclined surfaces of the clamp releasably engages corresponding surfaces of the enlarged diameter shaft portion upon insertion and removal of the jig.

8. The apparatus according to claim 6 wherein the clamp includes means responsive to pneumatic pressure for engaging and releasing the shaft portion of the jig from the bore.

9. The apparatus according to claim 1 further comprising a cutting tool disposed on the peripheral surface of each said electrode for removing welding contaminates in the surface.

10. The apparatus according to claim 1 wherein the sensing means calculates a decrease in the diameter of said one of the electrodes in accordance with a cumulative rotational frequency of a motor driving said one electrode.

11. The apparatus according to claim 1 further comprising a cutting tool mounted to the base and positioned a predetermined distance relative the peripheral surface of the one electrodes, and wherein the sensing means senses the diameter of said one of the pair of electrodes in accordance with the relative position of the cutting tool.

12. An apparatus for seam welding overlapping peripheral flange portions of two workpieces disposed one on top of the other to form a tank, the apparatus comprising:
    a base;
    a pair of roller electrodes rotatably mounted to the base, the electrodes having opposing peripheral surfaces for nipping and seam welding the overlapping peripheral flange portions of workpieces disposed therebetween;
    a jig, including a shaft portion for holding the two disposed workpieces;
    a robot assembly mounted to the base, the robot assembly including an articulate arm, having an outer end with a bore for receiving the shaft portion of the jig, the arm being manipulatable for moving the outer end thereof in horizontal, vertical and inclined planes relative to the opposing surfaces of the electrodes for maintaining the flange of the tank in the desired welding orientation regardless of the inclination and variation of the flange portion of the tank in the horizontal and vertical planes;
    means including a clamp and resilient means urging the clamp in engagement with the shaft portion, for detachably and rotatably mounting the jig in the bore of the arm; and
    control means including means for seam welding the peripheral flange portions of workpieces held by the jig during feeding of the flange portions between the opposing electrode surfaces.

* * * * *